(12) United States Patent
Bussières et al.

(10) Patent No.: US 11,700,109 B2
(45) Date of Patent: Jul. 11, 2023

(54) METHOD AND DEVICE FOR RECOGNIZING BLINDING ATTACKS IN A QUANTUM ENCRYPTED CHANNEL

(71) Applicant: ID Quantique SA, Carouge (CH)

(72) Inventors: Félix Bussières, Vessy (CH); Gaëtan Gras, Viry (FR)

(73) Assignee: ID Quantique SA, Carouge (CH)

( * ) Notice: Subject to any disclaimer, the term of this patent is extended or adjusted under 35 U.S.C. 154(b) by 0 days.

(21) Appl. No.: 17/751,811

(22) Filed: May 24, 2022

(65) Prior Publication Data

US 2022/0360425 A1    Nov. 10, 2022

Related U.S. Application Data

(63) Continuation of application No. 16/954,620, filed as application No. PCT/EP2018/085652 on Dec. 18, 2018, now Pat. No. 11,418,316.

(30) Foreign Application Priority Data

Dec. 22, 2017 (EP) .................................... 17210225

(51) Int. Cl.
*H04L 9/00* (2022.01)
*H04L 9/08* (2006.01)

(52) U.S. Cl.
CPC ............ *H04L 9/002* (2013.01); *H04L 9/0852* (2013.01)

(58) Field of Classification Search
CPC ............................. H04L 9/002; H04L 9/0852
(Continued)

(56) References Cited

U.S. PATENT DOCUMENTS 5,307,410 A * 4/1994 Bennett .................. H04B 10/70
398/40
8,320,769 B2  11/2012 Essiambre et al.
(Continued)

FOREIGN PATENT DOCUMENTS

CN    102739395 A    10/2012
CN    104007560 A *   8/2014
(Continued)

OTHER PUBLICATIONS

Zhang et al., "Detecting and Identifying Optical Signal Attacks on Autonomous Driving Systems," in IEEE Internet of Things Journal, vol. 8, No. 2, pp. 1140-1153, 15 Jan. 15, 2021, doi: 10.1109/JIOT.2020.3011690. (Year: 2021).*
(Continued)

*Primary Examiner* — Peter C Shaw
(74) *Attorney, Agent, or Firm* — Millen, White, Zelano & Branigan, P.C.; William Nixon

(57) ABSTRACT

A receiver for recognizes blinding attacks in a quantum encrypted channel having an optical fiber. The receiver includes a multipixel detector having a plurality of pixels, and configured to be illuminated by a light beam outputted by the optical fiber. A processing unit connects to the multipixel detector and is configured to determine the presence of a blinding attack if a predetermined number of pixels detects light within a predetermined interval. The receiver recognizes blinding attacks in a quantum encrypted channel and implements a method for recognizing blinding attacks in a quantum encrypted channel.

12 Claims, 4 Drawing Sheets

(58) Field of Classification Search
USPC .......................................................... 726/223
See application file for complete search history.

(56) References Cited

U.S. PATENT DOCUMENTS

| | | | | |
|---|---|---|---|---|
| 9,634,835 | B2* | 4/2017 | Legré | H04L 9/002 |
| 2016/0266242 | A1* | 9/2016 | Gilliland | G01S 7/4863 |
| 2016/0313445 | A1* | 10/2016 | Bailey | G01S 7/4816 |
| 2020/0284883 | A1* | 9/2020 | Ferreira | G01S 17/10 |

FOREIGN PATENT DOCUMENTS

| | | | | | |
|---|---|---|---|---|---|
| CN | 104007560 | A | | 8/2014 | |
| CN | 204128683 | U | * | 1/2015 | |
| CN | 204128683 | U | | 1/2015 | |
| CN | 102739395 | B | * | 1/2016 | |
| CN | 108375417 | A | * | 8/2018 | G01J 1/0403 |
| CN | 108375417 | A | | 8/2018 | |
| CN | 111970279 | A | * | 11/2020 | G06N 3/08 |
| CN | 111970279 | A | | 11/2020 | |
| KR | 20120040202 | A | | 4/2012 | |
| WO | WO-2019121783 | A1 | * | 6/2019 | H04B 10/70 |

OTHER PUBLICATIONS

Wang et al., "Authentication of Optical Physical Unclonable Functions Based on Single-Pixel Detection", arXiv:2111.09699, Nov. 15, 2021. (Year: 2021).*

Li et al., "A Survey on Optical Adversarial Examples Against DNNs," 2022 4th International Conference on Data-driven Optimization of Complex Systems (DOCS), Chengdu, China, 2022, pp. 1-6, doi: 10.1109/DOCS55193.2022.9967715. (Year: 2022).*

Stipcevic et al., "Preventing detector blinding attack and other random number generator attacks on quantum cryptography by use of an explicit random number generator," arXiv:1403.0143, 2014, pp. 1-4 (Year: 2014).*

Shen et al., "Countering Detector Manipulation Attacks in Quantum Communication through Detector Self-testing," 2022 European Conference on Optical Communication (ECOC), Basel, Switzerland, 2022, pp. 1-3. (Year: 2022).*

Merlo et al., "Detector blinding attacks on counterfactual quantum key distribution," arXiv.2011.02693, 2020, pp. 1-14 (Year: 2020).*

International Search Report PCT/EP2018/085652 dated Feb. 11, 2019 (pp. 1-4).

Huang et al., "Testing Random-Detector-Efficiency Countermeasure in a Commercial System Reveals a Breakable Unrealistic Assumption," in IEEE Journal of Quantum Electronics, vol. 52, No. 11, pp. 1-11, Nov. 2016, doi: 10.1109/JQE.2016.2611443. (Year: 2016).

Ali et al., "Avoiding Fake State or Bright Light Attack on the Single-Photon Detector," arXiv.1909.04805, 2019, pp. 1-9. (Year: 2019).

Yuan et al.: "Resilience of gated avalanche photodiodes against bright illumination attacks in quantum cryptography" (arxiv.org, Cornell Univ. Library (2011) pp. 1-4.

* cited by examiner

METHOD AND DEVICE FOR RECOGNIZING BLINDING ATTACKS IN A QUANTUM ENCRYPTED CHANNEL

The present invention relates to a method and a device for recognizing blinding attacks in a quantum encrypted channel.

PRIOR ART

Quantum cryptography or quantum key distribution is a method allowing the distribution of a secret key between two distant parties, the emitter and the receiver, with a provable absolute security. Quantum key distribution relies on quantum physics principles and encoding information in quantum states, or qubits, as opposed to classical communication's use of bits. Usually, photons are used for these quantum states. Quantum key distribution exploits certain properties of these quantum states to ensure its security.

More particularly, the security of this method comes from the fact that the measurement of a quantum state of an unknown quantum system modifies the system itself. In other words, a spy eavesdropping on a quantum communication channel cannot get information on the key without introducing errors in the key exchanged between the emitter and the receiver thereby informing the user of an eavesdropping attempt.

The encryption devices enable secure transmission of useful payload by performing some kind of symmetric encryption using the keys exchanged by quantum key distribution. Specific quantum key distribution systems are described for instance in U.S. Pat. No. 5,307,410, and in the article by C. H. Bennett entitled "Quantum cryptography using any two non-orthogonal states", Phys. Rev. Lett. 68, 3121 (1992).

Photon detectors are one of the main targets of attacks in quantum hacking. It was demonstrated experimentally that detectors, such as avalanche photodiode and superconducting nanowire single-photon detector, can be controlled by bright light. This can be exploited to cause a breach in the security of practical quantum key distribution systems.

For example, bright light applied to an avalanche photodiode normally operating in the Geiger mode, where it can register the detection of a single-photon, can force it to operate in the so-called linear mode, where it will not register single photons, but it will register light pulses with much larger power.

FIG. 1 schematically illustrates a quantum encrypted system, for instance a quantum key distribution system, according to prior art. The system 1000 comprises a transmitter 1100, for instance a quantum key distribution transmitter, and a receiver 1200, for instance a quantum key distribution receiver, which are connected through a quantum encrypted channel 1300, for transmitting encrypted information. An eavesdropper 1400 might exploit the loopholes of practical implementations of quantum encrypted channels and hack the information transmitted through the quantum channel 1300. In particular, the eavesdropper 1400 might apply a bright laser to blind the detectors installed in the receiver 1200, and control the information. This way of blinding and then remotely controlling the detector can be exploited by a malicious party to gain some information about the key generated by quantum key distribution. If proper countermeasures are not implemented, the malicious party can perform this attack without revealing its presence to the legitimate users. A similar situation applies to superconducting nanowire single-photon detectors.

It is therefore desirable to find a way to protect systems against these attacks. Different solutions have been provided. Generally those solutions introduce new components in the quantum key distribution setup. This, on the other hand, can facilitate other types of attacks.

A countermeasure against blinding attack, as described in L. Lydersen et al. Nature Photonics, 4, 686-689 (2010), consists in introducing a strongly unbalanced beam splitter, for instance with a 90%-10% splitting ratio, at the input of the receiver. The 90% exit of the beam splitter is connected to the detection system of the receiver, while the 10% exit is connected to an optical power meter. If the eavesdropper tries to attack with bright light, the power meter measures a non-zero optical power, and the attack is revealed. Nevertheless, the implemented solution is based on introducing an additional component, namely the beam splitter, whose ratio can be manipulated by accurately tuning the wavelength of the bright beam.

Another countermeasure, as described in T. Honjo et al, Optics Express, 3, 2667 (2013), consists in using N detectors which are illuminated through a fiber beam splitter that equally divides the light among them. Under bright light attack, the N detectors will be all illuminated. By analyzing the rate of coincidental clicks between the N detectors, the attack can be detected. This countermeasure is based on a fiber beam splitter, which is a component whose coupling ratio can depend on wavelength. Hence, light at another wavelength can in principle be used for blinding only part of the N detectors, and therefore make the countermeasure unsuccessful.

Another countermeasure, as described in J. Wang et al., Eur. Phys. J. D. (2016) 70:5, consists in improving the optical scheme of the decoding unit of the quantum key distribution system. In particular, the quantum key distribution receiver is equipped with two receiving systems that are connected to a coupler. The coupler plays the same role of the beam splitters of the abovementioned solutions.

Another countermeasure, as described in T. da Silva et al., Optics Express 18911, 20 (2012), consists in implementing a real-time monitoring system of single photon detectors. In particular, the detector is constantly monitored and if it receives an intense beam light, a variation of the after-pulse is detected and the communication is stopped.

Another countermeasure, as described in U.S. Pat. No. 9,634,835 B2, consists in randomly switching the parameters of the detector, in a way that cannot be predicted by an eavesdropper. The probability of the detection, which depends on the detector's parameters, is constantly monitored, and if the attacker tries to manipulate the detector, since it is impossible to the attacker to know the detector's parameters, the attacker might affect the detection rate, and the attack would be registered.

Therefore, there is a need for a quantum communication apparatus, for instance a quantum key distributor, that is secure against blinding attack without containing additional components, which facilitate other kinds of attacks.

SUMMARY OF THE INVENTION

The invention has been made to address the above described problems and generally relies on the usage of a detector comprising a plurality of pixels, or a multipixel detector as it will be referred to in the following. In particular, in some embodiments, the beam is focused directly from the optical fiber onto the plurality of pixels, which is allowed by the dimensions of the multipixel detector. In this manner, no elements whose operation can be controlled, by controlling the characteristics of the blinding light, are placed between the optical fiber and the detector, thus avoiding the problems associated with the prior art.

This advantageously allows avoiding blinding attacks. In particular light reaching the plurality of pixels of the multipixel detector illuminates each pixel with approximately the same intensity. Hence, when bright light is used to attempt blinding the detector, all pixels are illuminated and most of them will be blinded substantially simultaneously. This can be registered by a processing system so as to identify blinding attacks. In particular during normal operation in a quantum encrypted channel, since a single photon is expected, a single pixel is expected to measure a signal at a given time. An increased conditional coincidence rate can therefore advantageously be used as an indication of a detector blinding attack.

In particular, an embodiment of the invention can relate to a receiver for recognizing blinding attacks in a quantum encrypted channel comprising an optical fiber, comprising a multipixel detector comprising a plurality of pixels, and configured to be illuminated by a light beam outputted by the optical fiber, and a processing unit connected to the multipixel detector and configured to determine the presence of a blinding attack if a predetermined number of pixels detects light within a predetermined interval.

In some embodiments, the multipixel detector can be configured such that the plurality of pixels can be illuminated from the light beam outputted by the optical fiber, without the presence of any splitting element between the optical fiber and the multipixel detector.

In some embodiments, a space between the optical fiber and the multipixel detector can comprise only gas and/or an encapsulating material of the multipixel detector.

In some embodiments, a distance between the optical fiber and the plurality of pixels of the multipixel detector, or the distance between a lens and the plurality of pixels of the multipixel detector, can be selected so that the light beam can expand to a size substantially corresponding to an area of the multipixel detector covered by the pixels.

In some embodiments, the multipixel detector can be configured so that if the area of the multipixel detector is partitioned in N parts, where N is preferably comprised between 2 and 8, and if the N parts are partitioned in a substantially symmetrical fashion with respect to a centre of the multipixel detector, then each of the N parts can comprise a substantially similar amount of area of each pixel of the multipixel detector.

In some embodiments, the multipixel detector can be configured so that any area of the multipixel detector which is larger 1 micrometre can comprise at least two pixels.

In some embodiments, the receiver can further comprise a basis selector, connected along the optical fiber, and/or a mode scrambler, connected along the optical fiber.

An embodiment of the invention can further relate to a use of a receiver according to any of the previous embodiments for recognizing blinding attacks in a quantum encrypted channel.

An embodiment of the invention can further relate to a method for recognizing blinding attacks in a quantum encrypted channel comprising an optical fiber, the method comprising the steps of detecting a light outputted by the optical fiber by means of a receiver, comprising a multipixel detector comprising a plurality of pixels, configured to be illuminated by the light, counting a number of pixels which detected light within a predetermined interval, and evaluating a presence of a blinding attack based on the result of the counting step.

In some embodiments, the step of counting can comprise a step of computing a computed detection rate for a pixel of the multipixel detector, and the step of evaluating can comprise a step of comparing the computed detection rate to an expected theoretical detection rate.

In some embodiments, the step of counting can comprise a step of comprises the step of computing a computed conditional coincidence rate for at least two pixels of the multipixel detector, and the step of evaluating can comprise a step of comparing the computed conditional coincidence rate to an expected theoretical conditional coincidence rate.

In some of the embodiments related to the method, the receiver can be a receiver according to any of the previous embodiments.

DETAILED DESCRIPTION OF PREFERRED EMBODIMENTS

Figure 1:
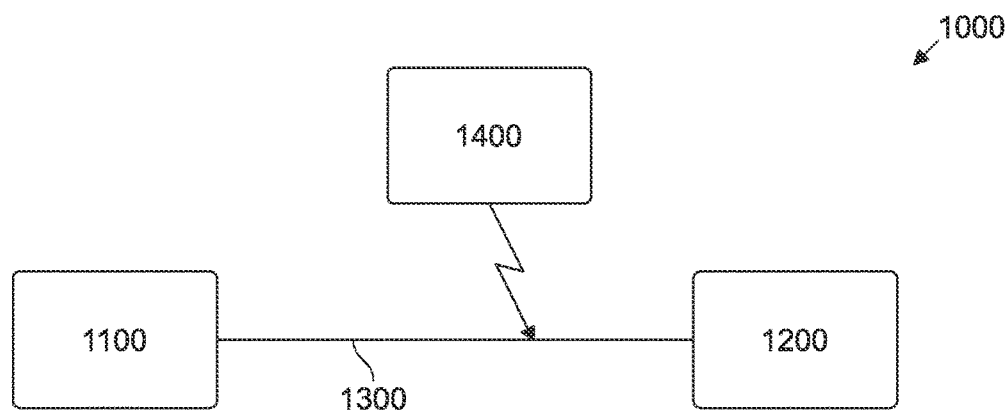
FIG. 1 schematically illustrates a quantum key distribution system for transmitting encrypted information, according to prior art, FIG. 2 schematically illustrates a quantum encrypted system, FIG. 3 schematically illustrates a method for recognizing blinding attacks, FIG. 4 schematically illustrates possible arrangements of the pixels of a multipixel detector, FIG. 5 schematically illustrates a possible arrangement of the pixels of a multipixel detector, FIG. 6 schematically illustrates possible arrangements of the pixels of a multipixel detector, FIG. 7 schematically illustrates a beam shape from an optical fiber operating in single mode and in multimode, FIG. 8 schematically illustrates a quantum encrypted system, FIG. 9 schematically illustrates a possible implementation of a processing unit, FIG. 10 schematically illustrates a method for recognizing blinding attacks.
Figure 2:
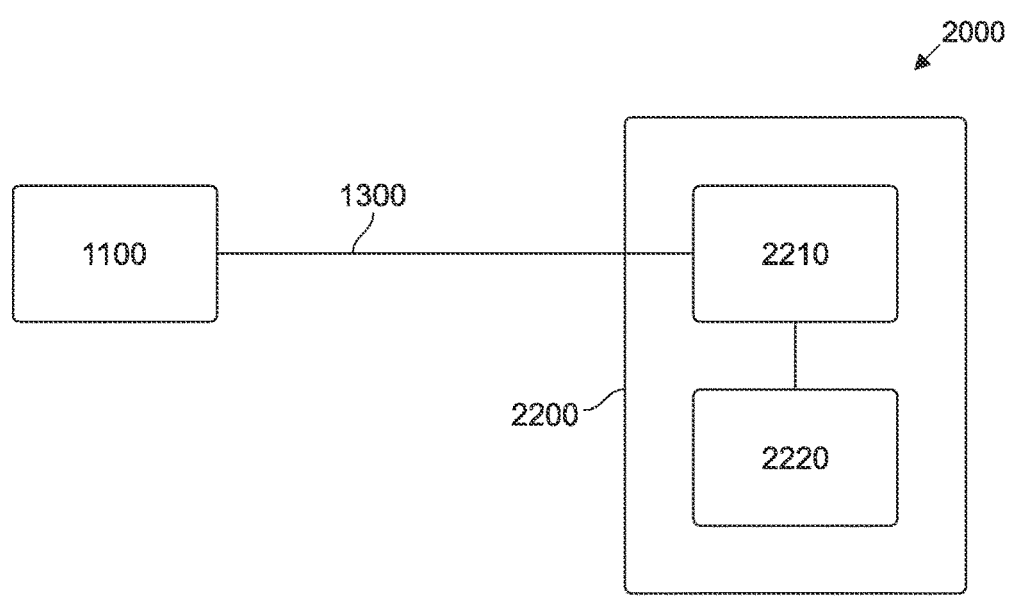

FIG. 2 schematically illustrates a quantum encrypted system 2000, for instance a system for quantum key distribution, according to an embodiment of the invention.

The quantum encrypted system 2000 includes a transmitter 1100 and a receiver 2200 which are connected through a physical quantum encrypted channel 1300. The quantum encrypted channel may be implemented, for instance, by means of an optical fiber, wherein the quantum encryption is achieved by controlling the quantum state of the photons traveling on the optical fiber.

The receiver 2000 comprises a multipixel detector 2210, comprising a plurality of pixels, and configured to be illuminated by a light beam outputted by the optical fiber of the quantum encrypted channel 1300, preferably in a substantially uniformly manner, that is such that the light beam covers the entire active area of the multipixel detector 2210. The receiver 2000 further comprises a processing unit 2220 connected to the multipixel detector 2210 and configured to determine the presence of a blinding attack if a predetermined number of pixels detects light within a predetermined interval.

In some embodiments, the number of pixels could be from 2 to 20, preferably from 2 to 8, even more preferably from 2 to 8. Thanks to this approach it is possible to provide good performances of the system in terms of identification of blinding attacks, together with a contained cost for the multipixel detector 2210.

In some embodiments, the multipixel detector 2210 is configured such that the plurality of pixels can be illuminated from the light outputted by the optical fiber, without the presence of any element, in particular any splitting element, between the optical fiber and the multipixel detector 2210, for instance a beam splitter. In those cases, the end of the optical fiber can be placed at a predetermined distance from the multipixel detector 2210, as will be discussed below, so as to allow the light beam to expand to a dimension substantially corresponding to the area covered by the plurality of pixels. By avoiding the presence of any splitting element between the optical fiber and the multipixel detector 2210 it is possible to avoid the disadvantages associated with some of the prior art solutions, in which the introduction of elements such as beam splitters, the operation of which can be manipulated by controlling the characteristics of the blinding light.

In some embodiments, the space between the optical fiber and the multipixel detector 2210 does therefore not comprise any beam splitter, or more generally any other optical element which can split the beam and the operation of which can be controlled by controlling the characteristics of the blinding light, so as to make it possible to control on which pixels the light will shine, by controlling the physical characteristics of the light.

Alternatively, or in addition, in some embodiments a space between the optical fiber and the multipixel detector 2210 comprises only gas and/or an encapsulating material of the multipixel detector 2210. In this manner it is advantageously possible to avoid controlling of the propagation path of the blinding light, since the gas and/or the encapsulating material do not allow for such operation.

In particular, the gas could be any one of, or a mixture of, air, Argon, Helium, $CO_2$, and/or $N_2$. Moreover, the pressure of the gas could be comprised between $10^{-9}$ mBar and 10 Bar, preferably between $10^{-8}$ mBar and 1 Bar. Additionally, the encapsulating material could be one of, or a mixture of, glass and/or transparent resin. In some embodiments the encapsulating material could have a thickness in the range of 100 micrometre to 5 mm.

Thanks to the absence of any splitting component directing the light towards the different pixels of the multipixel detector 2210, a blinding attack in which light can be directed to only selected pixels by manipulating the characteristics of the light, such as in the prior art, is impossible.

In some embodiments, a distance between the optical fiber and the pixels of the multipixel detector 2210 can be selected so that the light beam can expand to a size substantially corresponding to the area of the multipixel detector 2210 covered by the pixels. In some preferred embodiments, the distance between the optical fiber and the pixels of the multipixel detector 2210 can be comprised between 0 and a few micrometre for superconducting nanowire single-photon detectors and up to approximately 15 mm for other technologies of photon detectors. It will be clear that those distances can be controlled by the introduction of a lens in the light beam path, in known manners. In particular, in some embodiments, the distance between the fiber multipixel detector 2210 can be intended as the distance between a lens, placed between the fiber and the multipixel detector 2210, and the multipixel detector 2210. In general the distance will be sufficient to allow the light beam to expand to a size sufficient for covering the active area of the detector, in some embodiments an area having a diameter between 2 micrometre and 5 mm.

The invention therefore advantageously allows the detection of blinding attacks by using a plurality of pixels, substantially similar among each other, of a multipixel detector 2210. This is also particularly advantageous with respect to the prior art, in which the split beams are often directed to two or more separate detectors, in some cases having different characteristics among them. The implementation of the invention, by replacing this plurality of detectors with a single multipixel detector 2210 allows a significant cost reduction in addition to the security advantages mentioned above. Furthermore, by implementing the invention with a single multipixel detector 2210, only one detector has to be precisely positioned with respect to the optical fiber, while the prior art with more than one detector makes this precise positioning much more complex.

Figure 3:
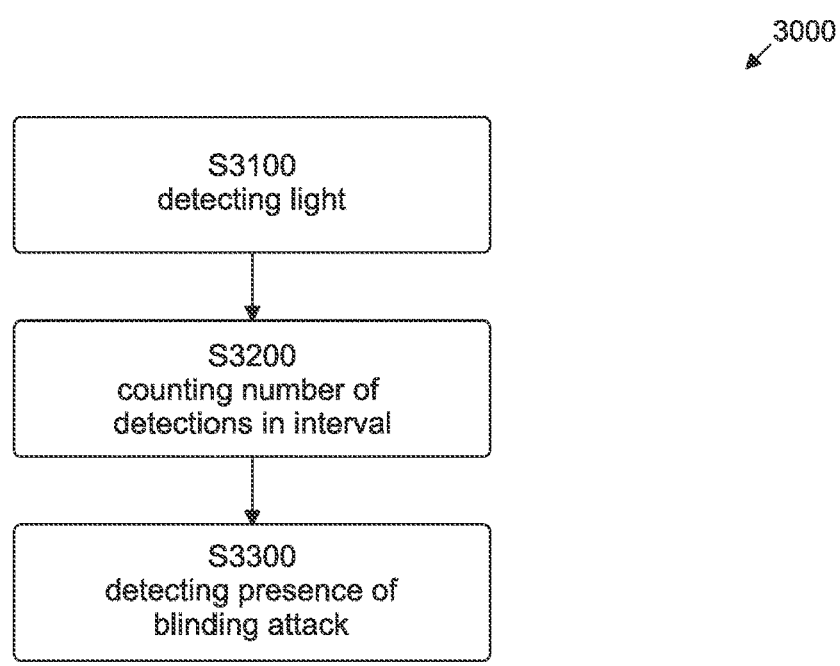

FIG. 3 schematically illustrates a method 3000 for recognizing blinding attacks according to an embodiment of the invention.

In particular, the method 3000 for recognizing blinding attacks in the quantum encrypted channel 1300 comprising an optical fiber, comprises a step S3100 of detecting a light outputted by the optical fiber by means of the multipixel detector 2210. In a subsequent step S3200 a number of pixels which detected light within the predetermined interval is counted. Finally, in a step S3300 the presence of a blinding attack based on the result of the counting step S3200 is evaluated. Namely, if a sufficient number of pixels indicated the presence of light within the predetermined interval, it can be concluded that a blinding attack is present.

In some embodiments, the predetermined interval can be comprised between 1 ps and 100 ns, preferably between 10 ps and 10 ns, even more preferably between 50 ps and 2 ns. These intervals ensure that the various pixels indicating presence of light are not reacting to separate pulses of light, or separate photons, as it would be the case under normal operation, but rather are reacting to a blinding attack.

In some embodiments at least two of the plurality of pixels of the multipixel detector 2210 detecting light within the predetermined interval for the method 3000 indicate the presence of a blinding attack.

Figure 4:
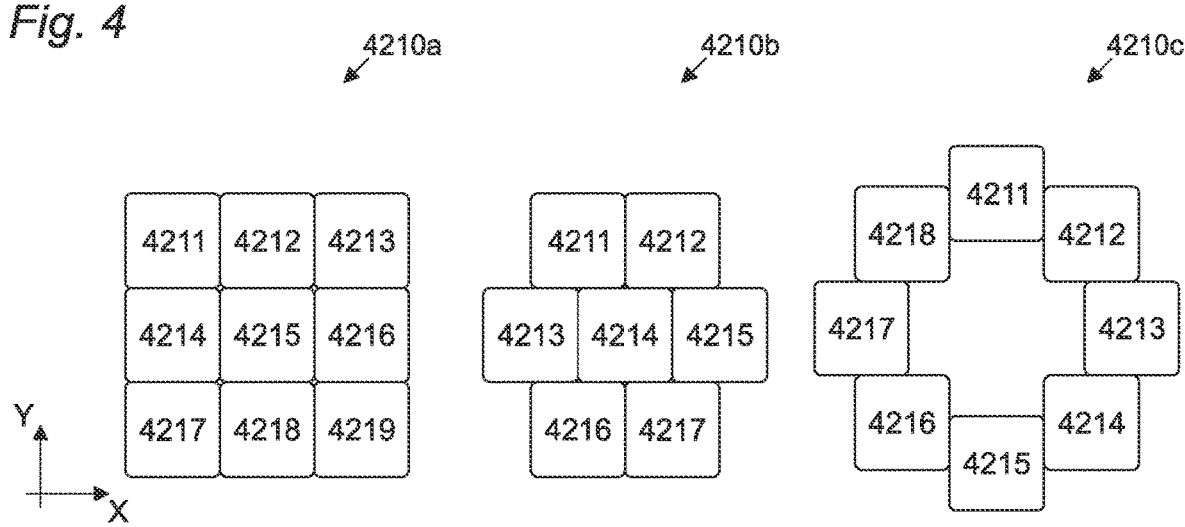

FIG. 4 schematically illustrates three possible embodiments of how the plurality of pixels 4211-4219 of the multipixel detector 2210 could be arranged. It will be clear that a plurality of arrangement can be implemented, as long as at least two, preferably more, of the pixels can be illuminated by the light beam from the optical fiber, preferably without inserting any additional optical element between the optical fiber and the pixels.

In particular FIG. 4 illustrates a multipixel detector 4210a comprising an array arrangement, which advantageously provides a particular compact size, thus making it easier to illuminate all pixels with the light beam from the optical fiber. FIG. 4 further illustrates a multipixel detector 4210b comprising an array arrangement in which the pixels of different lines have a similar pitch but they are shifted with respect to the pixels of the previous line. Preferably the shift substantially corresponds to half of the pitch. This configuration advantageously provides a more round shape, compared to the one of multipixel detector 4210a, which may adapt better to the generally rounded shape of the beam from the optical fiber. FIG. 4 further illustrates a multipixel detector 4210c comprising circular arrangement in which the pixels are placed in a substantially circular shape. This configuration advantageously provides a more likely equal repartition of the light of the beam on each pixel, compared to the solution of multipixel detector 4210*b*, in which the central pixel 4214 may in some cases receive more light than the remaining pixels.

In some embodiments, each of the pixels 4211-4219 may have a size between 0.1 micrometre by 0.1 micrometre to 16 micrometre by 16 micrometre, preferably between 0.5 micrometre by 0.5 micrometre to 5 micrometre by 5 micrometre, even more preferably between 1 micrometre by 1 micrometre to 3 micrometre by 3 micrometre.

While the arrangement in FIG. 4 distributes the pixels over the area of the multipixel detector in a manner in which each pixel occupies a specific region of the multipixel detector 4210, it is also possible to distribute each pixel over substantially the entire multipixel detector while sharing the area of the multipixel detector among several pixels.

Figure 5:
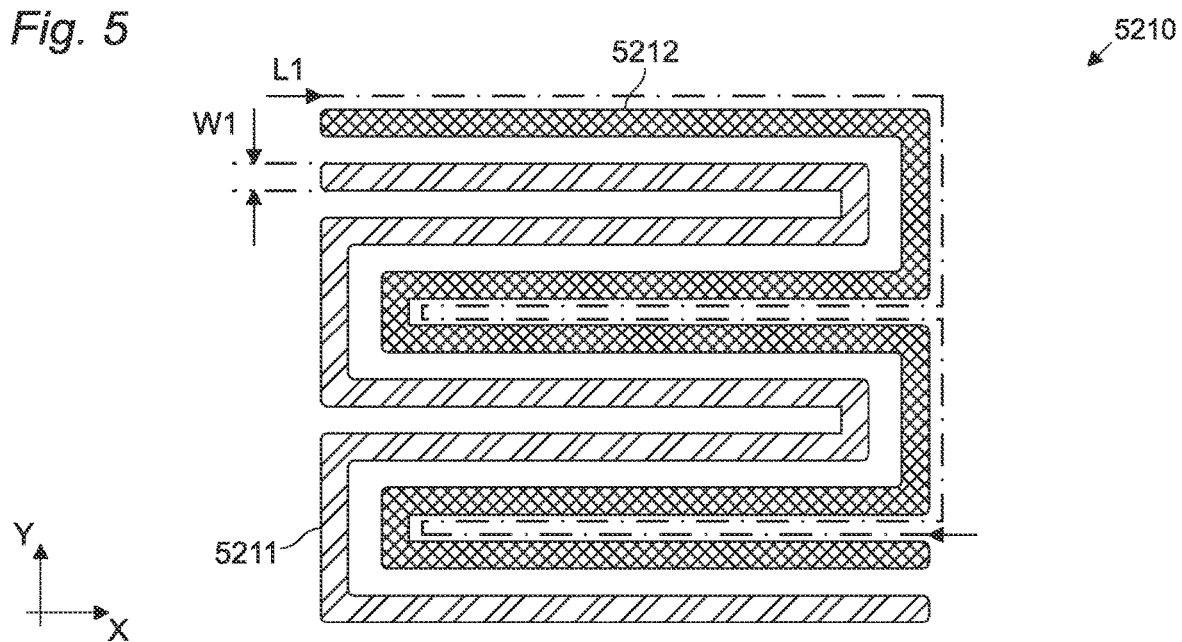

FIG. 5 illustrates another possible implementation of a multipixel detector 2210 according to the present invention. In particular, multipixel detector 5210 includes two pixels having 5211 and 5212 arranged in a comb shaped manner. It will be clear that alternative arrangements can be implemented as long as the pixels can be arranged so as to allow their area to be distributed on the total area of the multipixel detector 5210 in a substantially similar manner among the pixels. That is, alternative implementation, in which the various pixels share the total area of the multipixel in a substantially similar manner, could be implemented.

In some embodiments, if the area of the multipixel detector 5210 is partitioned in N parts, where N is preferably comprised between 2 and 8, the partitioning being substantially symmetrical with respect to the centre of the multipixel detector 5210, each of those N parts can comprise a substantially similar amount of area of each pixel. In some embodiments, the amount of area of each pixel within a single part can be within +/−25% of the average of the areas of all pixels in that part, preferably within +/−10%.

In some embodiments, any area of the multipixel detector 5210 which is larger than 1 micrometre comprises at least two pixels 5211-5212.

In the specific implementation illustrated in FIG. 5, each of the active areas 5211 and 5212 is substantially elongated with a width W1 comprised between 50 nm and 200 nm preferably between 100 nm and 170 nm, and a length L1 comprised between 10 micrometre and 2 mm. Each of the active areas 5211 and 5212 comprises substantially longer side and shorter sides interconnecting the substantially longer sides, thereby allowing the combed shape to be obtained. The multipixel detector of FIG. 5 can be implemented by means of superconducting nanowire single-photon detectors as active areas 5211 and 5212.

In some embodiments, in particular those in which the multipixel detector is implemented by means of superconducting nanowire single-photon detectors, the multipixel detector could have a fill factor, that is the percentage of area of the detector covered by active areas, such as active areas 5211, 5212 or covered by pixels, such as pixels 4211-4219, which is in the range from 10% to 80%.

Figure 6:
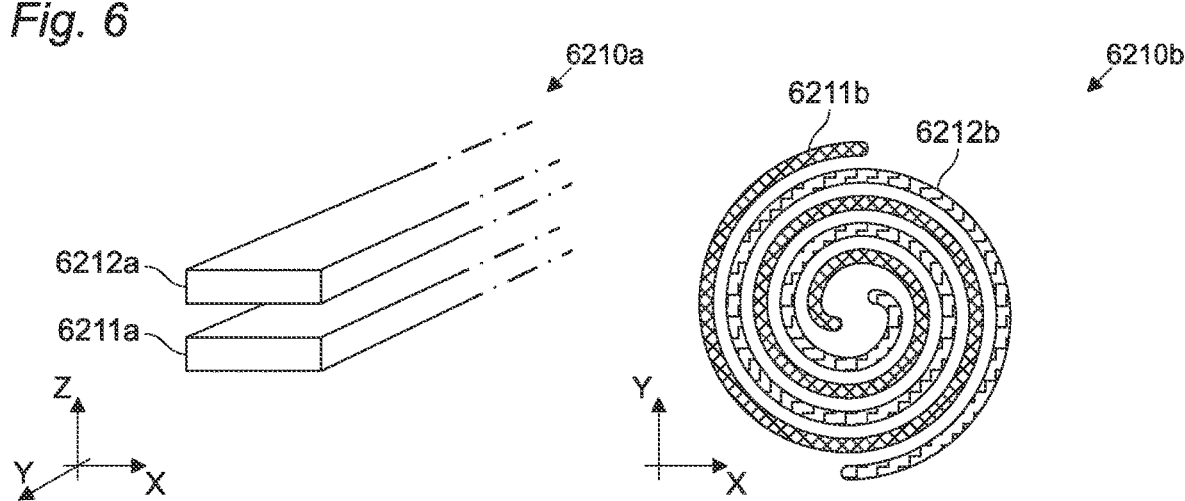

An alternative possible implementations 6210*b* of the multipixel detector 2210, in which the multipixel detector is covered by multiple pixels 6211*b*, 6212*b* sharing the area of the multipixel detector in a substantially similar manner is provided in FIG. 6. Moreover, FIG. 6 also illustrates a possible implementation 6210*a* in which the plurality of pixels 6211*a*, 6212*a* are placed one above the other. This implementation can be obtained, for instance, by using superconducting nanowire single-photon detectors for the pixels 6211*a*, 6212*a*, for instance as described by the document "Superconducting Single-Photon Detectors with Enhanced High-Efficiency Bandwidth", Stephan Krapick et al. Thanks to the arrangement of the pixels 6211*a*, 6212*a* one above the other it is possible to ensure that a blinding light pulse will inevitably trigger both pixels 6211*a*, 6212*a*, independently on the position of the blinding light pulse on the multipixel detector 6210*a*.

Figure 7:
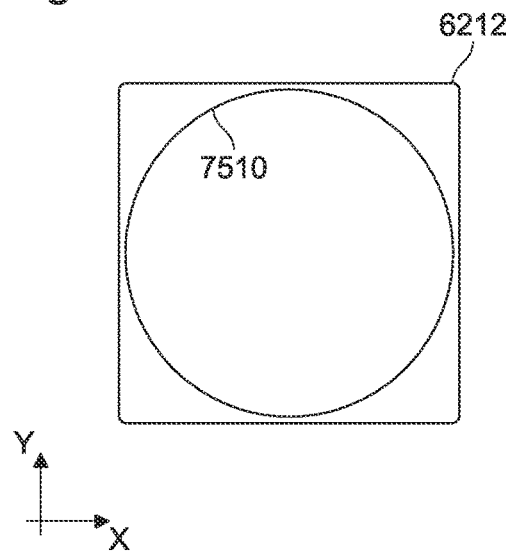
Figure 7:
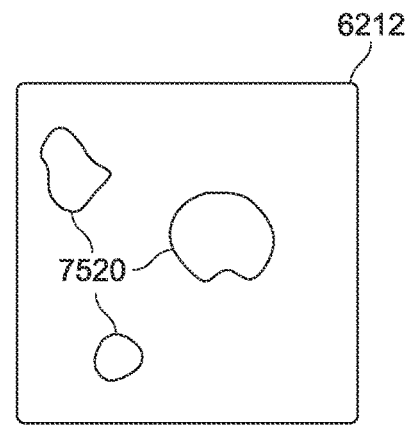

One further advantage of the embodiments illustrated in FIGS. 5 and 6 can be better understood with reference to FIG. 7.

In particular, FIG. 7 illustrates twice, once on the left and once on the right side, a schematically represented multipixel detector 2210. Here the multipixel detector 2210 is schematically represented as having a square shape, it will however be clear that other shapes can be implemented, based for instance on the description above. On the left side, a light beam 7510 resulting from a single mode transmission is schematically illustrated while on the right side, a light beam 7520 resulting from a multimode transmission is schematically illustrated. As can be seen, while the single mode light beam 7510 has a substantially uniform circular shape, the multimode light beam 7520 has a substantially uniform shape comprising one or more regions in which the beam is present, while leaving other regions of the multipixel detector 2210 in the dark.

In some cases, the size of each of the regions of light beam 7520 can be approximately 1 micrometre in diameter. The multipixel detector can therefore be configured such that in any region thereof which is larger than 1 micrometre, at least two pixels, or two active areas, are present.

The multimode beam 7520 is such that the number of regions and their positioning can be controlled by controlling the characteristics of the light in the optical fibre, such as its wavelength. This introduces a further issue, since an attacker may control the light beam 7520 so as to focus it substantially on a single pixel, thereby avoiding a control in which a detection from plurality of pixels is indicative of a blinding attack, such as in the case of method 3000.

The multipixel detectors of FIGS. 5 and 6 provide a solution also to this additional problem since even if the beam 7520 is concentrated in a single region, smaller than the multiplex detector, it still will cover at least two pixels thus allowing the recognition of the attack.

Figure 8:
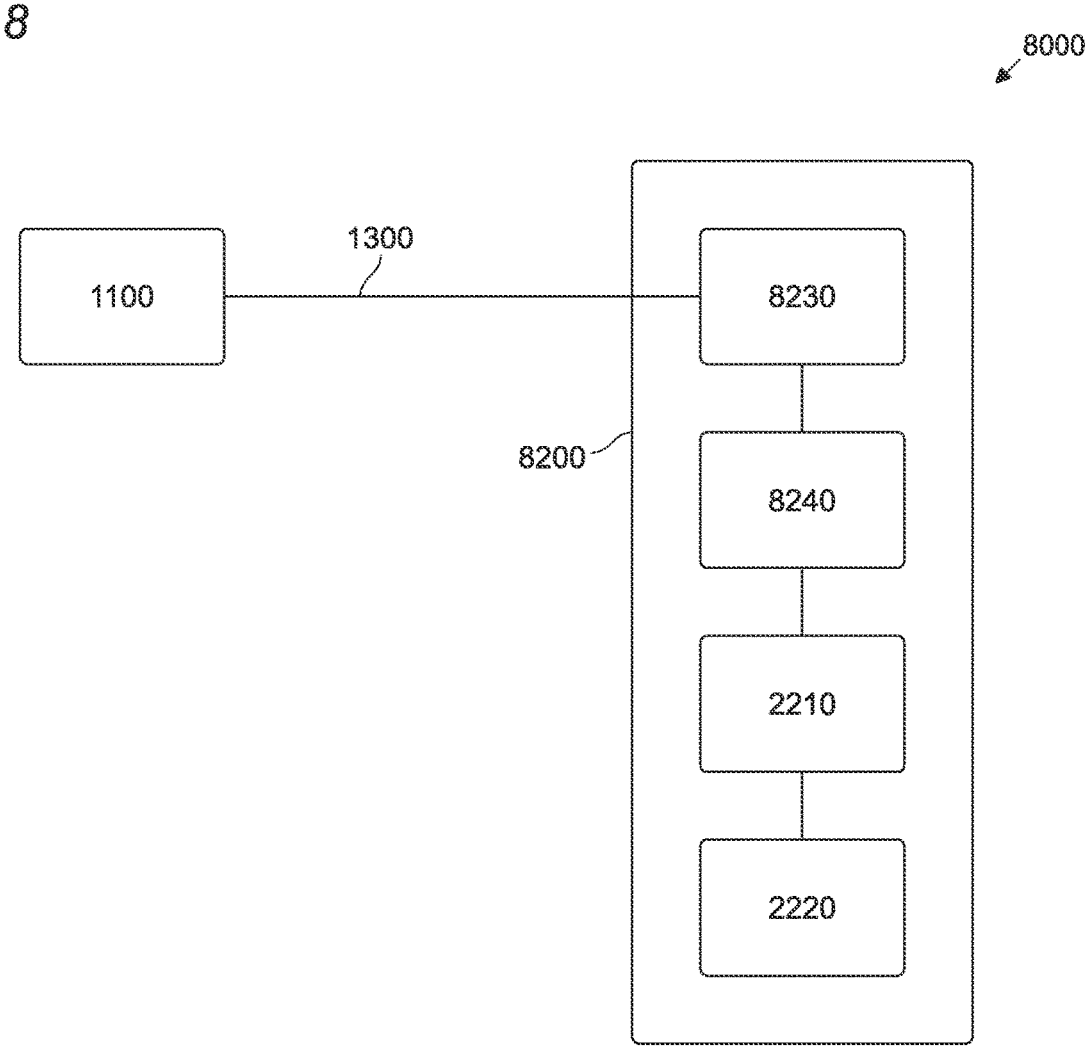

FIG. 8 schematically illustrates a quantum encrypted system 8000 which also provides a solution to this problem. In addition, the quantum encrypted system 8000 also allows this solution to be implemented with the multipixel detectors of FIG. 4.

In addition to the elements already described for FIG. 2, the quantum encrypted system 8000 differs by comprising in receiver 8200 a basis selector 8230 and/or a mode scrambler 8240. As it will be clear based on the following description, in some embodiments only the basis selector 8230 may be implemented while in other embodiments the mode scrambler 8240 may be added to the basis selector The basis selector 8230 allows selecting the basis for the quantum signal, which transports the information to be securely transmitted. The mode scrambler 8240 allows mixing the different modes in a way to have a uniformly distributed light spot. This allows to having a light beam shaped closer to beam 7510 than to beam 7520 because the regions of beam 7520 are distributed over the surface of the multipixel detector by the mode scrambler 8240.

Thanks to the presence of the mode scrambler 8240, the principal degrees of freedom which may be exploited by an eavesdropper 1400 to hack the quantum encrypted system 8000, namely (1) the wavelength of the light in the optical fiber, (2) the modes of the light, can be rendered ineffective.

In particular, the wavelength and polarization of the light cannot be used as basis of an attack due to the design of the system, that is, thanks to the absence of optical splitting components that could be manipulated between the optical fiber and the multipixel detector. Controlling the modes of the light also does not provide a basis for an attack thanks to the presence of the mode scrambler 8240, and in some embodiments thanks to the design of the multipixel detector.

Figure 9:
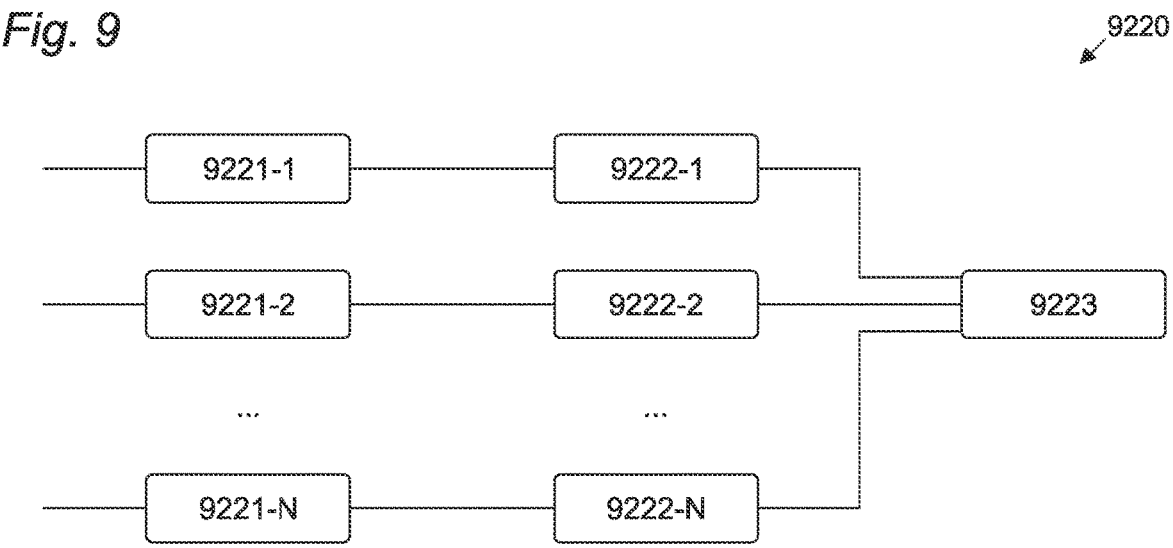

FIG. 9 schematically illustrates a possible implementation of a processing unit 9220, which could implement the processing unit 2220.

As can be seen in FIG. 9, the processing unit 9220 comprises N discriminators 9221, N time tagging units 9222 and at least one processor 9223. Each discriminator 9221 is connected to a respective pixel to determine when the pixel clicks due to an incoming photon, or photons. Each time tagging unit 9222 is connected to a respective discriminator 9221 so as to time-tag the clicking of the respective pixel. The time-tagged information is then input to the processor 9223, which can then carry out steps S3200 and S3300 described above, namely counting the number of pixels which clicked in the predetermined time interval and determine the presence of a blinding attack based on the count.

In alternative embodiments, instead of using discriminators 9221, time tagging units 9222 and the processor 9223 the output of the various pixels could be connected to a logic AND port, such that the output of the AND port can be used to detect a plurality of pixels reacting to a blinding attack.

In some embodiments, the processor 9330 can analyze the signal received from the time tagging units 9222 to calculate a detection rate of each pixel R_i, from the detection times, and/or a rate of coincidental counts R_c between the pixels of the multipixel detector. The parameters R_i and/or R_c can then be exploited by the system to determine the occurrence of a blinding attack.

Figure 10:
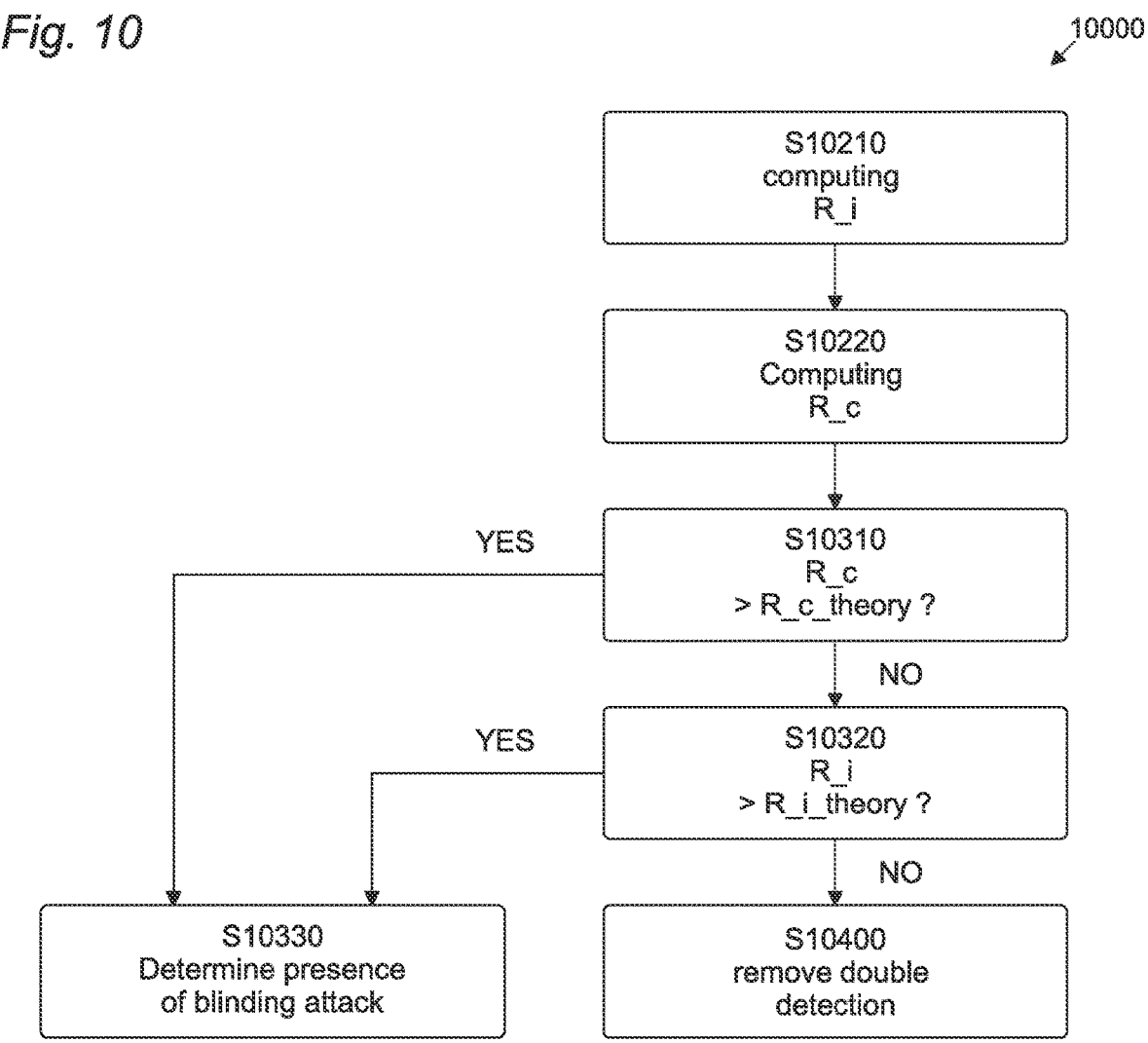

FIG. 10 schematically illustrates a method 1000 for recognizing blinding attacks, according to a further embodiment of the invention. It will be clear to those skilled in the art that method 10000 can be implemented by using the processing unit 9220 or, more generally, any processing unit 2220 capable of detecting clicks of pixels of a multipixel detector The method 10000 differs from method 3000 in the replacement of step S3200 by steps S10210 and S10220 and of step S3300 by steps S10310-S10330. Moreover a further step S10400 is added.

In particular, in step S10210, a detection rate R_i is computed while in step S10220 a conditional coincidence rate R_c is computed which defines the probability for a pixel j to click, if a pixel i clicked.

In particular, Pi can be defined as the probability of detecting one photon on a given pixel i, as $$Pi=fp*fi*p1*ni \quad \text{(Eq. 1)}$$

where
fp is a factor depending on the quantum encryption protocol used,
fi depends on the illumination of pixel i,
p1 is the probability to have only one photon within the predetermined interval,
ni is the efficacy of the pixel i
moreover Pij can be defined as the probability of detecting two photons on two given pixels i and j, as $$Pij=fp*fij*p2*ni*nj \quad \text{(Eq. 2)}$$

where
fij depends on the illumination of pixel and of pixel j,
p2 is the probability to have photons within the predetermined interval,
nj is the efficacy of the pixel j
then R_c_theory for pixels i and j can be computed as $$R\_c\_theory=Pij/T \quad \text{(Eq. 3)}$$

while R_i_theory can be computed as $$R\_i\_theory=Pi/T \quad \text{(Eq. 4)}$$

where
T indicates the predetermined time interval in which the detection of one or two photons is considered.

In step S10310, it is evaluated if the measured coincidence rate R_c is higher than the reference value R_c_theory. R_c_theory represents a predefined value corresponding to a theoretical lower bound for simultaneous clicks. This value can be introduced as an input depending on the security level and the parameters of the detectors. In particular, while the value of R_c can be computed from the measurement of the multipixel detector, the value of R_c_theory can be computed from the design parameters of the system. That is, R_c_theory indicates what is expected during the normal operation of the system while R_c indicates the actually measured values.

A value of R_c higher than R_c_theory implies the possibility of a blinding attack. In fact, a blinding light beam impinging on the multipixel detector can cause the clicking of many pixels, differently from a single-photon detection, as would be expected in the absence of blinding attacks. In the case of R_c higher than R_c_theory the method 1000 proceeds to step S10330 indicating the presence of a binding attack.

If the conditional coincidence rate R_c is lower than the theoretical threshold R_c_theory, the method proceeds to step S10320 in which it verifies if the detection rate R_i of a given pixel is higher than a theoretical lower bound R_i_theory. Although represented only once, it will be clear that step S10320 can be carried out for all of the pixels of the multipixel detector. R_i_theory represents a predefined value corresponding to a theoretical lower bound for expected clicks. This value can be introduced as an input depending on the security level and the parameters of the detectors.

This additional verification carried out at step S10320 advantageously prevents from the possibility of the attacker to exploit the differences between the pixels, which may be difficult to avoid in some implementations. In fact, in some implementations, the pixels may not be identical. The eavesdropper 1400 can then exploit the differences between each pixel, such as for instance recovery time and/or blinding power to hack the system.

More specifically, power thresholds or recovery times may be exploited by the eavesdropper 1400 to force only one pixel to click. However, in those cases, the pixel clicking would always be the same pixel, since this depends on the characteristic slope of the voltage of the detector. That is, when blinded, the voltage across the pixel, for instance a superconducting nanowire single-photon detector, is kept high. However, detections occur when the rising edge of the voltage intersects the threshold. To achieve this in an attack, the blinding light is interrupted for a short timeslot to sufficiently decrease the voltage. In this way, when the bright light is applied again, the voltage suddenly increases and a click is registered. In practice however, the decreasing speed of the voltage is not the same for each pixel, but there will be one pixel, with a slope such that it firstly intersects the threshold. As a consequence, compared to the other pixels, the pixel with such a slope will always be forced to firstly click. This implies that such a particular pixel will show a very high detection rate.

That is, the eavesdropper 1400 is not able to choose which detector clicks repeatedly due to the blinding attack. In fact, the first pixel reaching a ready state, in which it may reach again to incoming light, will be the same every time, as this depends on the characteristic slope of the voltage as previously described. Therefore, this pixel will show a number of counts higher than the other pixels. By comparing the rate of detection R_i of the pixel to the R_i_theory value, it is then possible to detect the blinding attack at step S10330.

If the step 10330 has a negative output, then the method 10000 continues to step S10400. Here the information received, such as parts the quantum key transmitted over quantum encrypted channel 1300, which have been received in the presence of a blinding attack are removed. That is, information associated to a double detection, indicative of a blinding attack, is removed.

In some alternative embodiments it is also possible to compare the rate of detection R_i of one pixel to the rate of detection R_i of one or more of the other pixels, or to the average of one or more of the other pixels, so as to indicate a deviation of the detection R_i for the pixel under analysis. In this manner it is possible to implement step S10320 without referring to the R_i_theory value.

It will be clear that, although the method 10000 has been described as comprising both steps S10310 and S10320, alternative embodiments are possible in which only one of those two steps is present, since each of them is independently capable of detecting the presence of a blinding attack.

It will further be clear that although the method 10000 has been described as comprising both steps S10330 and S10400, alternative embodiments are possible in which only step S10330 is present. In particular, in some embodiments it may be sufficient to determine the presence of a blinding attack by means of step S10330, for instance as a signal to completely discard the received information for a predetermined period of time.

Moreover, although the embodiments above have each been described with a specific set of features and/or elements, it will be clear that alternative embodiments of the invention can be implemented by selecting only some of those features and/or elements and possibly combining them in manners not explicitly described above or illustrated in the figures but within the scope of the invention, which is defined by the claims.

LIST OF REFERENCE NUMERALS

1000: quantum encrypted system
1100: transmitter
1200: receiver
1300: quantum encrypted channel
1400: eavesdropper
2000: quantum encrypted system
2200: receiver
2210: multipixel detector
2220: processing unit
3000: method for recognizing blinding attacks
S3100: detecting light
S3200: counting number of detections in interval
S3300: detecting presence of blinding attack
4210*a*: multipixel detector
4210*b*: multipixel detector
4210*c*: multipixel detector
4211-4219: pixel
5210: multipixel detector
5211-5212: pixel
6210*a*: multipixel detector
6211*a*-6212*a*: pixel
6210*b*: multipixel detector
6211*b*-6212*b*: pixel
7510: single mode light beam
7520: multimode light beam
8000: quantum encrypted system
8200: receiver
8230: basis selector
8240: mode scrambler
9220: processing unit
9221: discriminator
9222: tagging unit
9223: processor
10000: method for recognizing blinding attacks
S10210: computing detection rate
S10220: computing coincidental counts
S10310: evaluate coincidental counts
S10320: evaluate detection rate
S10330: determine presence of blinding attack
S10400: removing double detection

The invention claimed is:

1. A receiver (2200, 8200) for recognizing blinding attacks in a quantum encrypted channel (1300) comprising an optical fiber, comprising a multipixel detector (2210, 4210*a*, 4210*b*, 4210*c*, 5210, 6210*a*, 6210*b*) comprising a plurality of pixels (4211-4219, 5211-5212, 6211*a*-6212*a*, 6211*b*-6212*b*), and configured to be illuminated by a light beam outputted by the optical fiber, and a processing unit (2220) connected to the multipixel detector (2210, 4210*a*, 4210*b*, 4210*c*, 5210, 6210*a*, 6210*b*) and configured to determine the presence of a blinding attack if a predetermined number of pixels (4211-4219, 5211-5212, 6211*a*-6212*a*, 6211*b*-6212*b*) detects light within a predetermined interval, wherein the light beam expands to the area covered by the predetermined number of pixels.

2. The receiver (2200, 8200) according to claim 1,
wherein, the multipixel detector (2210, 4210*a*, 4210*b*, 4210*c*, 5210, 6210*a*, 6210*b*) is configured such that the plurality of pixels (4211-4219, 5211-5212, 6211*a*-6212*a*, 6211*b*-6212*b*) can be illuminated from the light beam outputted by the optical fiber, without the presence of any splitting element between the optical fiber and the multipixel detector (2210, 4210*a*, 4210*b*, 4210*c*, 5210, 6210*a*, 6210*b*).

3. The receiver (2200, 8200) according to claim 1,
wherein a space between the optical fiber and the multipixel detector (2210, 4210*a*, 4210*b*, 4210*c*, 5210, 6210*a*, 6210*b*) comprises only gas and/or an encapsulating material of the multipixel detector (2210, 4210*a*, 4210*b*, 4210*c*, 5210, 6210*a*, 6210*b*).

4. The receiver (2200, 8200) according to claim 1,
wherein a distance between the optical fiber and the plurality of pixels of the multipixel detector (2210, 4210*a*, 4210*b*, 4210*c*, 5210, 6210*a*, 6210*b*), or the distance between a lens and the plurality of pixels of the multipixel detector (2210, 4210*a*, 4210*b*, 4210*c*, 5210, 6210*a*, 6210*b*), is be selected so that the light beam can expand to a size substantially corresponding to an area of the multipixel detector (2210, 4210*a*, 4210*b*, 4210*c*, 5210, 6210*a*, 6210*b*) covered by the pixels.

5. The receiver (2200, 8200) according to claim 1, wherein the multipixel detector (2210, 5210, 6210*a*, 6210*b*) is configured so that if the area of the multipixel detector (2210, 5210, 6210*a*, 6210*b*) is partitioned in N parts, where N is preferably comprised between 2 and 8, and if the N parts are partitioned in a substantially symmetrical fashion with respect to a centre of the multipixel detector (2210, 5210, 6210*a*, 6210*b*), then each of the N parts comprises a substantially similar amount of area of each pixel (4211-4219, 5211-5212, 6211*a*-6212*a*, 6211*b*-6212*b*) of the multipixel detector (2210, 5210, 6210*a*, 6210*b*).

6. The receiver (2200, 8200) according to claim 1, wherein the multipixel detector (2210, 5210, 6210*a*, 6210*b*) is configured so that any area of the multipixel detector (2210, 5210, 6210*a*, 6210*b*) which is larger 1 micrometre comprises at least two pixels (5211-5212, 6211*a*-6212*a*, 6211*b*-6212*b*).

7. The receiver (8000) according to claim 1, further comprising a basis selector (8230), connected along the optical fiber, and/or a mode scrambler (8240), connected along the optical fiber.

8. The use of a receiver (2200, 8200) according to claim 1 for recognizing blinding attacks in a quantum encrypted channel (1300).

9. A method (3000, 10000) for recognizing blinding attacks in a quantum encrypted channel (1300) comprising an optical fiber, the method comprising the steps of detecting (S3100) a light outputted by the optical fiber by means of a receiver (2200, 8200), comprising a multipixel detector (2210, 4210*a*, 4210*b*, 4210*c*, 5210, 6210*a*, 6210*b*) comprising a plurality of pixels (4211-4219, 5211-5212, 6211*a*-6212*a*, 6211*b*-6212*b*), configured to be illuminated by the light, counting (S3200, S10210-S10220) a number of pixels (4211-4219, 5211-5212, 6211*a*-6212*a*, 6211*b*-6212*b*) which detected light within a predetermined interval, and evaluating (S3300, S10310-S10330) a presence of a blinding attack based on the result of the counting step (S3200, S10210)

wherein the light expands to the area covered by the number of pixels.

10. The method (10000) according to claim 9, wherein the step of counting (S10210) comprises a step of computing a computed detection rate (Ri) for a pixel of the multipixel detector (2210, 4210*a*, 4210*b*, 4210*c*, 5210, 6210*a*, 6210*b*), and the step of evaluating (S10320) comprises a step of comparing the computed detection rate (Ri) to an expected theoretical detection rate (R_i_theory).

11. The method (10000) according to claim 9, wherein the step of counting (S10220) comprises a step of comprises the step of computing a computed conditional coincidence rate (Rc) for at least two pixels of the multipixel detector (2210, 4210*a*, 4210*b*, 4210*c*, 5210, 6210*a*, 6210*b*), and the step of evaluating (S10310) comprises a step of comparing the computed conditional coincidence rate (R_c) to an expected theoretical conditional coincidence rate (R_c_theory).

12. The method (10000) according to claim 9, wherein the receiver (2200, 8200) is a receiver (2200, 8200) for recognizing blinding attacks in a quantum encrypted channel (1300) comprising an optical fiber.

* * * * *